US009235495B2

(12) United States Patent
Lin et al.

(10) Patent No.: US 9,235,495 B2
(45) Date of Patent: Jan. 12, 2016

(54) METHOD AND SYSTEM THAT PROVIDES AN INTERACTIVE DEBUGGING SESSION

(75) Inventors: Shihta Lin, San Jose, CA (US); Francisco Miguel Anaya, Hollister, CA (US); Wilfried Van Hecke, Idstein (DE); Vikram Manchala, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 1833 days.

(21) Appl. No.: 11/615,891

(22) Filed: Dec. 22, 2006

(65) Prior Publication Data

US 2008/0155505 A1 Jun. 26, 2008

(51) Int. Cl.
*G06F 9/44* (2006.01)
*G06F 11/36* (2006.01)

(52) U.S. Cl.
CPC ............ *G06F 11/3656* (2013.01); *G06F 11/36* (2013.01); *G06F 11/362* (2013.01); *G06F 11/3664* (2013.01)

(58) Field of Classification Search
None
See application file for complete search history.

(56) References Cited

U.S. PATENT DOCUMENTS

| | | | | |
|---|---|---|---|---|
| 6,058,393 | A * | 5/2000 | Meier et al. | 707/999.01 |
| 6,938,245 | B1 | 8/2005 | Spertus et al. | 717/127 |
| 7,117,483 | B2 | 10/2006 | Dorr et al. | 717/124 |
| 7,673,180 | B1 * | 3/2010 | Chen et al. | 714/38.11 |
| 2003/0233634 | A1 | 12/2003 | Carrez et al. | 717/124 |
| 2004/0230954 | A1 | 11/2004 | Dandoy | 717/124 |
| 2005/0022167 | A1 | 1/2005 | Gryko et al. | 717/124 |
| 2005/0022170 | A1 | 1/2005 | Brown et al. | 717/125 |
| 2005/0246688 | A1 | 11/2005 | Gupta et al. | 717/124 |
| 2005/0278855 | A1 | 12/2005 | Spencer | 714/46 |
| 2006/0059466 | A1 | 3/2006 | Duron et al. | 717/124 |
| 2006/0059467 | A1 | 3/2006 | Wong | 717/124 |
| 2006/0174225 | A1 | 8/2006 | Bennett et al. | 717/124 |
| 2007/0124435 | A1 * | 5/2007 | Wobbe | 709/220 |

OTHER PUBLICATIONS

Moher, Thomas G.; "A Process Visualization and Debugging Environment," IEEE Transactions on Software Engineering, vol 14, No. 6, Jun. 1988.

* cited by examiner

*Primary Examiner* — Jason Mitchell
*Assistant Examiner* — Mark Gooray
(74) *Attorney, Agent, or Firm* — Janaki K. Davda; Konrad, Raynes, Davda & Victor LLP

(57) ABSTRACT

A computer program product is disclosed. The computer program product includes a computer useable medium having a computer readable program. The computer readable program when executed on a computer causes the computer to receive user specific data for a debugging session. The user specific data includes a location for an input/output device. Further, the computer readable program when executed on the computer causes the computer to initiate a debugging session at the input/output device specified at the location in the user specific data.

25 Claims, 5 Drawing Sheets

METHOD AND SYSTEM THAT PROVIDES AN INTERACTIVE DEBUGGING SESSION

BACKGROUND

1. Field

This disclosure generally relates to testing software applications for errors. More particularly, the disclosure relates to an interactive debugging session.

2. General Background

Software applications may encounter errors (also called "bugs") that lead to a number of problems, e.g., incorrect modification of data, system crashes, slower performance, etc. Software developers often attempt to discover as many bugs as possible during the development of the software application to eliminate the presence or at least minimize the number of bugs in the software application prior to release of the software application to the end user. A debugger is a software tool that a programmer utilizes to "debug" a program, i.e., find the bugs in a program. The debugger runs concurrently with the execution of the program and allows the programmer to monitor and control that execution. For instance, the programmer can monitor a particular variable or memory register to see what changes take place during execution. Further, the programmer can insert "break points," i.e., locations within the source code at which the debugger can pause execution of the program. The programmer can attempt to make sure that the program is executing properly at particular locations. Accordingly, the programmer can then narrow down potential locations in the source code at which bugs are located.

However, errors may occur within a program after its release because of bugs that were not found beforehand. The programmer then needs to further debug the program. Once again, the programmer can utilize the debugger to debug the program. Realistically, the process of debugging may continue well after the release of the program until the program no longer becomes useful or is improved upon.

Accordingly, the process of debugging can be a long an arduous task that often involves teams of programmers, especially with a larger software application. As a result, multiple programmers should ideally be able to debug the same program at the same time. If only one programmer at a time is allowed to make changes to the code, the efficiency of multiple programmers debugging is significantly, if not completely, hampered.

Current systems do not provide a seamless approach that allows multiple programmers to debug the same code at the same time. Additional infrastructure is utilized on a case-by-case basis and often requires specific implementations such as the granting of special system privileges or rebuilding an application. For instance, a privilege is utilized in many systems to allow for a change to an address for an input/output ("I/O") device for which a debugging session is to occur. A normal programmer does not usually have such a privilege and, therefore, wastes time attempting to obtain such an address change from someone who does have the privilege. Further, the location of the I/O device is usually dependent on the software application. In other words, an I/O device address may be utilized irrespective of the programmer that is utilizing the I/O device at a given time. Therefore, if a first user initiates a debugging session at an I/O device, the debugging session occurs at the I/O device currently on record. If a second user initiates another debugging session at the same time, the additional debugging session will not be successfully established because the I/O device is currently in use by the first user. If the second user initiates a debugging session after the first user completes his or her debugging session, the debugging session is still established at the I/O device of the first user. This may be inconvenient for the second user, who may want to utilize a different I/O device than the first user. The software application may have to be rebuilt to allow for the second user to have a debugging session of his or her own. The utilization of additional infrastructure on a case-by-case basis is an inefficient approach because one programmer may have the resources for a particular infrastructure while another programmer may not have such resources. As a result, current systems are not user friendly, which is an attribute that a debugger should ideally have to allow for easy navigation by programmers.

SUMMARY

In one aspect of the disclosure, a computer program product is disclosed. The computer product includes a computer useable medium having a computer readable program. The computer readable program when executed on a computer causes the computer to receive user specific data for a debugging session. The user specific data includes a location for an input/output device. Further, the computer readable program when executed on the computer causes the computer to initiate a debugging session at the input/output device specified at the location in the user specific data.

In another aspect of the disclosure, a system is disclosed. The system includes a reception module that receives user specific data for a debugging session. The user specific data includes a location for an input/output device. Further, the system includes a debugging module that initiates a debugging session at the input/output device specified at the location in the user specific data.

In yet another aspect of the disclosure, a method is disclosed. The method receives user specific data for a debugging session. The user specific data includes a location for an input/output device. Further, the method initiates a debugging session at the input/output device specified at the location in the user specific data.

In another aspect of the disclosure, a computer program product is disclosed. The computer product includes a computer useable medium having a computer readable program. The computer readable program when executed on a computer causes the computer to receive user specific data for a debugging session. The user specific data includes a location for an input/output device. Further, the computer readable program when executed on the computer causes the computer to operate a debugging session, at the input/output device specified at the location in the user specific data, of a program concurrently with one or more additional debugging sessions of the software application being operated at one or more additional input/output devices distinct from the input/output device.

In yet another aspect of the disclosure, a computer program product is disclosed. The computer product includes a computer useable medium having a computer readable program. The computer readable program when executed on a computer causes the computer to receive a user specific runtime parameter for a debugging session. Further, the computer readable program when executed on the computer causes the computer to initiate a debugging session based on the user specific runtime parameter.

DRAWINGS

The above-mentioned features and objects of the present disclosure will become more apparent with reference to the following description taken in conjunction with the accompanying drawings wherein like reference numerals denote like elements and in which.

DETAILED DESCRIPTION

A centralized and consistent approach can be utilized by a debug engine to present an interactive debugging session. The approach provides a user friendly way for the programmer to specify an I/O device location for the I/O device that the programmer is utilizing to debug a program. Further, a list of programs to be debugged can be provided. In addition, other runtime conditions utilized in the debugging session can be provided. The I/O device location is provided to the debug engine, which can then initiate an interactive debugging session for the user at the I/O device that the programmer is utilizing.

Figure 1:
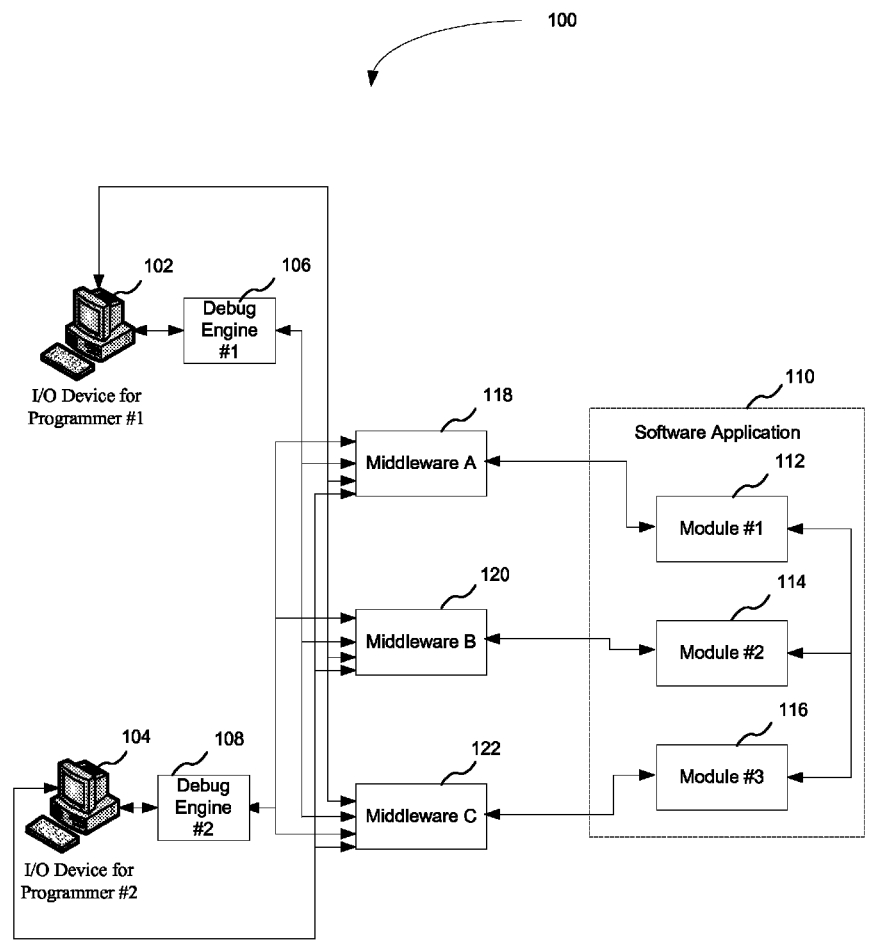
FIG. 1 illustrates a configuration in which multiple programmers attempt to initiate debugging sessions to debug a software application by communicating with a series of middleware components.

FIG. 1 illustrates a configuration 100 in which multiple programmers attempt to initiate debugging sessions to debug a software application 110 that is running (or executing) in a series of middleware components. In one embodiment, the software application 110 includes a plurality of modules, e.g., a first module 112, a second module 114, and a third module 116, that are each stored on different servers. For example, the software application 110 may be an ordering system that includes an inventory module, a purchase module, and a shipping module. These modules may have to be stored at physically disparate locations for the system to work properly. For instance, the inventory module may be stored on a server located at a warehouse whereas the purchase module may be stored on a server located at a location for financial processing. In one embodiment, the modules communicate with one another through a network such as the Internet, local area network ("LAN"), or the like.

In one embodiment, the programmers initiate the software application 110 prior to debugging so that the respective debug engine can control and monitor the software application 110. Accordingly, the programmers initiate the software application 110 through various middleware components, e.g., middleware A 118, middleware B 120, and middleware C 122, that act as intermediaries to the modules of the software application 110.

Once the software application 110 is invoked, a first programmer, utilizing a first I/O device 102, and a second programmer, utilizing a second I/O device 104, attempt to initiate debugging sessions with the software application 110. The first I/O device 102 can utilize a first debug engine 106 to debug the software application 110 while the second I/O device 104 can utilize a second debug engine 108 to debug the software application 110. However, the debug engines may not be located on the I/O devices. For instance, the debug engines may be located on separate servers from the I/O devices and are responsible for establishing the debugging sessions on the I/O devices. The debug engines should know the locations of the I/O devices in order to establish the debugging sessions. In one embodiment, the first debug engine 106 and the second debug engine 108 accomplish this by communicating with various middleware components, e.g., middleware A 118, middleware B 120, and middleware C 122, that act as intermediaries to the modules of the software application 110. The middleware components can perform tasks such as translating the requests made by the first I/O device 102 and the second I/O device 104 into commands that the software components can understand. However, each middleware component may utilize a different infrastructure for establishing a debugging session with the I/O devices. For example, middleware A 118 may have an infrastructure that grants system privileges to the programmer to specify the location of the I/O device and a list of programs that the programmer is interested in debugging where as middleware B 120 may have a different infrastructure that involves the programmer performing a rebuild after specifying the location of the I/O device and list of programs that the programmer is interested in debugging. As a result, the first programmer and the second programmer utilize knowledge of the different infrastructures for the various middlewares to initiate a debugging session for the software application 110.

Figure 2:
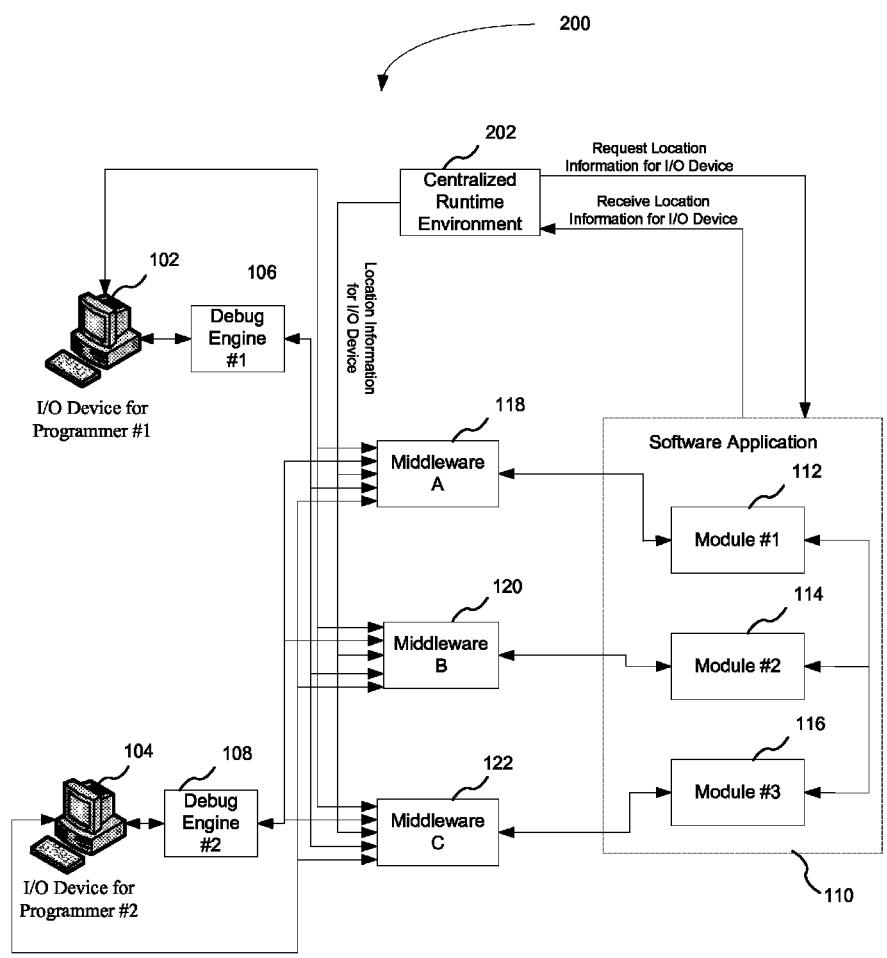
FIG. 2 illustrates a configuration in which multiple programmers can initiate debugging sessions for the software application by utilizing a centralized runtime environment.

FIG. 2 illustrates a configuration 200 in which multiple programmers can initiate debugging sessions for the software application 110 by utilizing a centralized runtime environment 202. In one embodiment, the centralized runtime environment 202 is an environment that can communicate with different middleware components. In other words, the centralized runtime environment can understand a variety of programming languages, e.g., C++, Fortran, COBOL, etc., that may be utilized in the different middleware components. Accordingly, the centralized runtime environment 202 can communicate effectively with and understand the particular nuances for each of the different middleware components. An example of the centralized runtime environment 202 is the IBM® Language Environment® runtime manufactured by IBM Corporation.

The configuration 200 utilizes the centralized runtime environment 202 to request and receive location information for a particular I/O device at which a programmer would like to initiate a debugging session. In another embodiment, the centralized runtime environment 202 also requests and receives a list of one or more programs to be debugged. As will be explained below, in one embodiment, the centralized runtime environment 202 accesses the location information for the I/O device through the software application 110. In another embodiment, the centralized runtime environment 202 accesses a list of one or more programs to be debugged through the software application 110.

Figure 3:
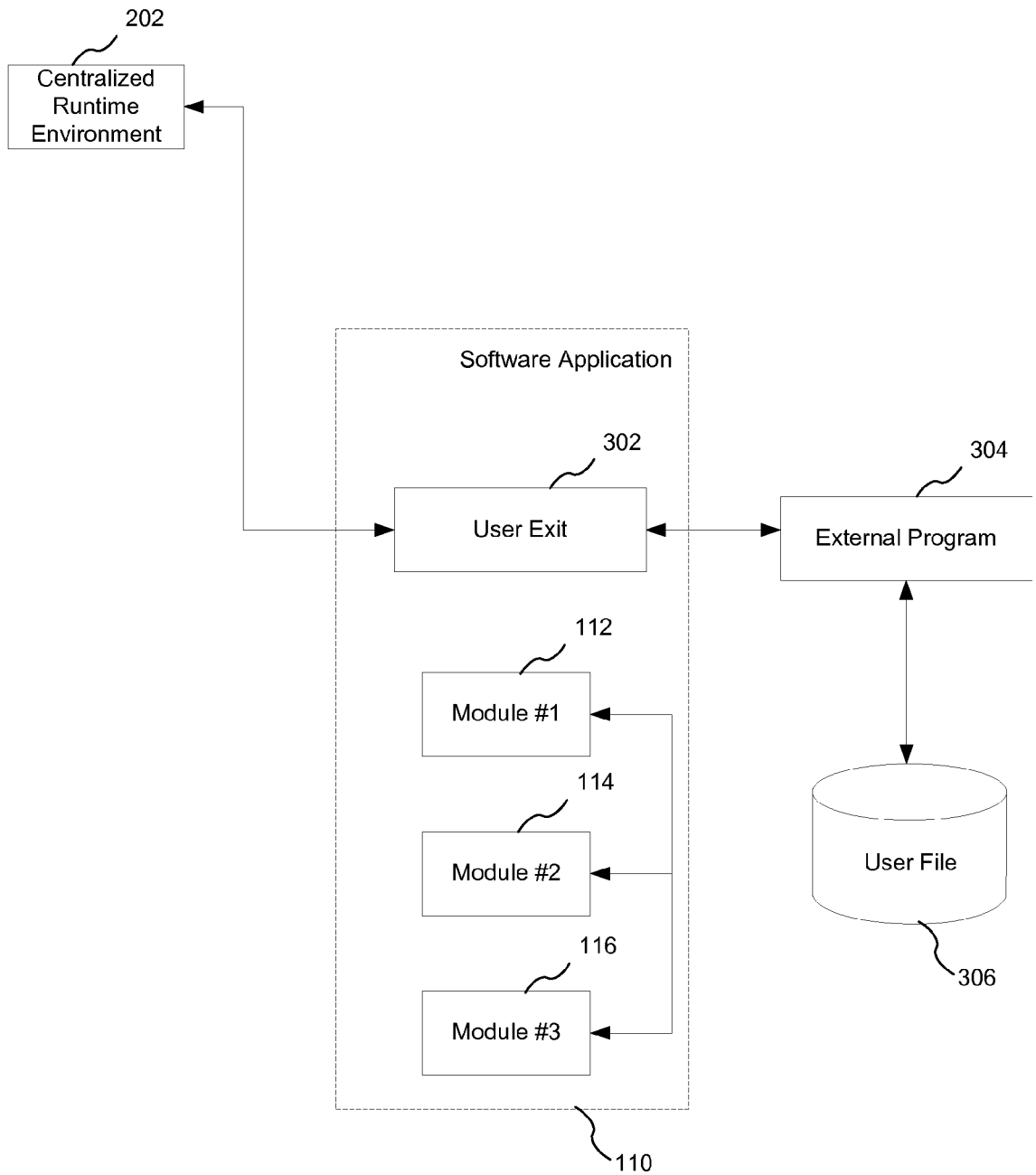
FIG. 3 illustrates an expanded view of the transfer of the location information of the I/O device from the software application to the centralized runtime environment.

Being that the centralized runtime environment 202 can communicate with each of the middleware components, the centralized runtime environment 202 can effectively provide the location information for the I/O device to each of the middleware components, which can then provide the location information for the I/O device to the debug engine. As a result, the debug engine does not need to be concerned with the different nuances of each of the different middleware components that are needed in order to obtain the location information for the I/O device. The middleware components can provide the location information for the I/O device to the debug engine so that the debug engine knows the location of the I/O device at which a debugging session is to be established. For instance, the first debug engine 106 does not need to be concerned with the different nuances of middleware A 118, middleware B 120, and middleware C 122 in order to obtain the location information for the I/O device 102 at which the debug engine 106 is attempting to initiate a debugging session from these middleware components. Rather, the centralized runtime environment 202 can communicate effectively with and provide the I/O device location information to the middleware components. Accordingly, each of the modules of the software application 110 can communicate with the first debug engine 106 to establish a debug session with the first I/O device 102. In another embodiment, a list of one or more programs to be debugged can also be provided by the centralized runtime environment 202 to the middleware components, which can then be provided to the debug engine. Further, the first debug engine 106 can be utilized to monitor and debug the programs on the list. In another embodiment, the list of programs is utilized by a user exit 302, as seen in FIG. 3 described below, to determine if the program should be debugged. If the program is to be debugged, the user exit passes runtime information, such as the I/O device location information, back to the central runtime environment 202. If the program is not to be debugged, the runtime information is not passed back to the central runtime environment 202 and a debug session is not initiated.

As a result, the configuration 200 allows the debug engine 106 to receive the I/O device location information and potentially other runtime information from the middleware components. The debug engine 108 can concurrently receive such information also. Further, the debug engine 106 can query the middleware components during the debug session to receive runtime information. The debug engine 108 can concurrently query the middleware components during the debug session also.

FIG. 3 illustrates an expanded view of the transfer of the location information of the I/O device from the user exit 302 to the centralized runtime environment 202. In another embodiment, a list of one or more programs to be debugged can be transferred from the user exit 302 to the centralized runtime environment 202. Prior to debugging, a programmer at the I/O device for which location information is being specified creates a user file 306. The user file 306 contains, among other things, the I/O device location information for the I/O device at which the programmer wishes to initiate a debug session. Further, the user saves the user file 306 with a name according to a naming pattern. An example of a naming pattern may be user_id.tool_name.tool_part_name. For instance, a naming patter of ELIN.TOOL.EQAUOPTS indicates that ELIN is the user id, TOOL is the tool name, and EQAUOPTS is the tool part name. One of ordinary skill in the art will recognize that a variety of other naming patterns may be utilized.

The user file 306 is a data set. In one embodiment, the user file 306 can be utilized on an operating systems such as the z/OS® operating system manufactured by IBM Corporation. In one embodiment, the contents of the user file 306 can be stored in the form of tags. An example of the tag that can be utilized can be seen in Extensible Markup Language ("XML"). For instance, a tag <PGM> can be utilized to indicate a list of programs to be debugged. Further, a tag <TST> can be utilized to indicate a test runtime option, which can contain the I/O device location information. In addition, a tag <RTO> can be utilized to indicate other runtime options. In another embodiment, a utility can be provided to help the programmer create the data set for the user file 306 in a formatted structure.

Prior to debugging, the programmer also builds the software application 110 with a user exit 302 linked into the software application 110. The user exit 302 is a call to an external program 304 that is utilized to provide functionality that is not necessarily intended for the software application 110. In one embodiment, the user exit 302 is built into the software application 110. In another embodiment, the user exit 302 is stand alone.

As an example, the main purpose of the software application 110 may be to provide an ordering system while the external program 304 provides functionality for accessing the user file 306. In one embodiment, the user file 306 may or may not be stored on the same storage medium as the software application 110, but is a distinct file. Accordingly, when the user exit 302 is called, the external program 304 accesses the user file 306 and can retrieve various information, such as location information for the I/O device, from the user file 306. In one embodiment, the user exit 302 contains the naming pattern utilized by the programmer to name the user file 306. The naming pattern can be placed in the user exit 302 prior to the software application 110 being built with the user exit 302. Further, the naming pattern can contain a suitable token that the external program 304 utilizes to substitute with the user identification ("ID") to invoke the software application 110.

The token is essentially a placeholder. In other words, the user ID is not hard coded into the naming pattern. As a result, when a user would like have a debugging session, the particular user ID of that user can be dynamically substituted for the token to create a unique data set name of the user file 306 for that user. The term dynamic is intended to mean that the software application 110 does not have to be rebuilt each time a user would like to invoke a debug session. Accordingly, multiple users can concurrently debug the software application 110 in an efficient manner by utilizing his or her own I/O device. Having user unique user files allows for multiple users to each have their own debugging sessions.

At the time that the programmer would like to initiate debugging of the software application 110, the programmer invokes the software application 110. During the initialization of the application, the centralized runtime environment 202 calls the user exit 302 to obtain the I/O device location information of the I/O device at which the user would like to initiate the interactive debugging session. Once the centralized runtime environment 202 obtains the I/O device location information, the centralized runtime environment 202 can provide that I/O device location information to the middleware components, as seen in FIG. 2. In another embodiment, a list of one or more programs to be debugged can also be obtained by the centralized runtime environment 202 and provided to the middleware components.

As shown in FIG. 3, the call to the user exit 302 invokes the external program 304 to open the user file 306. The user exit 302 contains the naming pattern, and, therefore, the external program 304 can reconstruct the name of the file in order to find the particular user file. Further, the external program 304 can dynamically obtain, from the middleware component, the user ID of the programmer that invoked the software application 110 and utilized the user ID in the naming pattern. As a result, the external program 304 can provide the location information to the user exit 302, which can then provide the location information to the centralized runtime environment 202 to facilitate an interactive debugging session between the first debug engine 106 and/or the second debug engine 108 and the software application 110 through the middleware components. In another embodiment, a list of one or more programs to be debugged can also be provided to by the external program 304 to the user exit 302. Further, the user exit 302 can also provide the list of one or more programs to be debugged to the centralized runtime environment 202.

This approach allows for the I/O device location information to be dependent on the user ID, which is unique, rather than the software application 110. When the I/O device location information is dependent on the software application 110, multiple users cannot debug the software application 110 at the same time as the only I/O device location information that would be provided to the middleware components would be the I/O device location information associated with the software application 110. By having user unique I/O device location information, the I/O device location information for each user can be provided to the middleware components to allow for concurrent debugging by multiple programmers. This can be accomplished because each user has a distinct user ID, and therefore, distinct user files are accessed for I/O device location information for each of the programmers. Accordingly, an end-to-end debugging approach is provided that allows multiple programmers to debug the same software application 110 at the same time, even if the software application 110 spans across multiple servers that interact with multiple middleware components.

In another embodiment, the user exit 302 can be a user exit for the centralized runtime environment 202. This user exit utilizes the tagged information in the data set of the user file 306 to filter user programs for debugging. If a programmer is requesting to debug a program that is on the program list in the user file 306, the user exit passes back debug information, which includes the device location information, to the centralized runtime environment 202. If the programmer is requesting to debug a program that is not on the program list in the user file 306, the user exit returns to the centralized runtime environment 202 without any debug information. As a result, that particular program runs without a debugging session.

Figure 4:
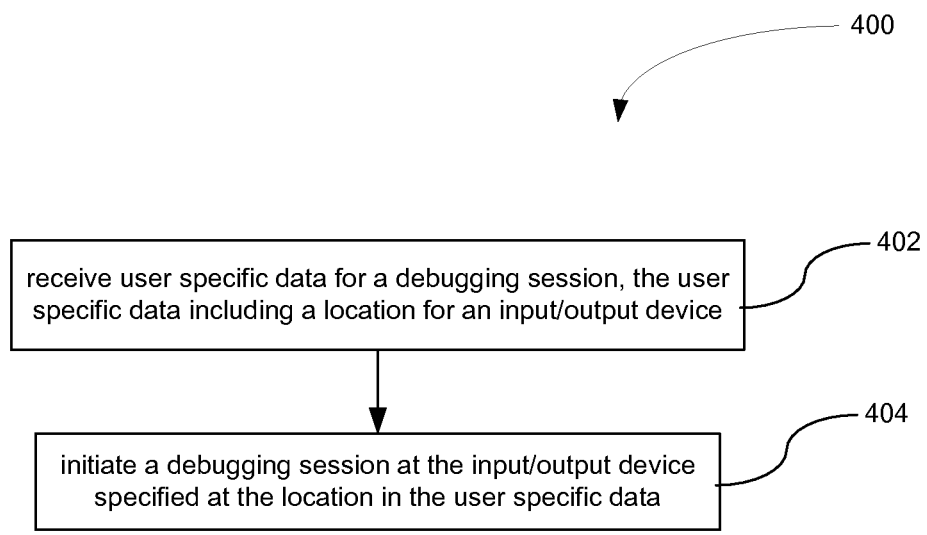
FIG. 4 illustrates a process for dynamic specification of location information for an I/O device that provides an interactive debugging session.

FIG. 4 illustrates a process 400 for dynamic specification of location information for an I/O device that provides an interactive debugging session. At a first process block 402, the process 400 receives user specific data for a debugging session. The user specific data includes a location for an input/output device. Further, at a process block 404, the process 400 initiates a debugging session at the input/output device specified at the location in the user specific data. In one embodiment, a computer program product comprises a computer useable medium having a computer readable program. The computer readable program when executed on a computer causes the computer to perform the process 400. For instance, the computer readable program can be a debug tool. In another embodiment, a system can be utilized. For instance, a reception module can receive user specific data for a debugging session. The user specific data includes a location for an input/output device. Further, a debugging module can initiate a debugging session at the input/output device specified at the location in the user specific data. In yet another embodiment, a method can perform the process 400.

The process 400 can be utilized for a variety of runtime parameters. In another embodiment, the process 400 receives a user specific runtime parameter for a debugging session. Further, the process 400 can initiate a debugging session based on the user specific runtime parameter.

Further, the process 400 can be utilized to allow multiple programmers to concurrently debug a program. In yet another embodiment, the process 400 receives user specific data for a debugging session. The user specific data includes a location for an input/output device. Further, the process operates a debugging session, at the input/output device specified at the location in the user specific data, of a program concurrently with one or more additional debugging sessions of the software application being operated at one or more additional input/output devices distinct from the input/output device.

Any of the embodiments described above can be utilized in a computer program product, system, or method configuration. Accordingly, a programmer can more efficiently debug the software application 110.

Figure 5:
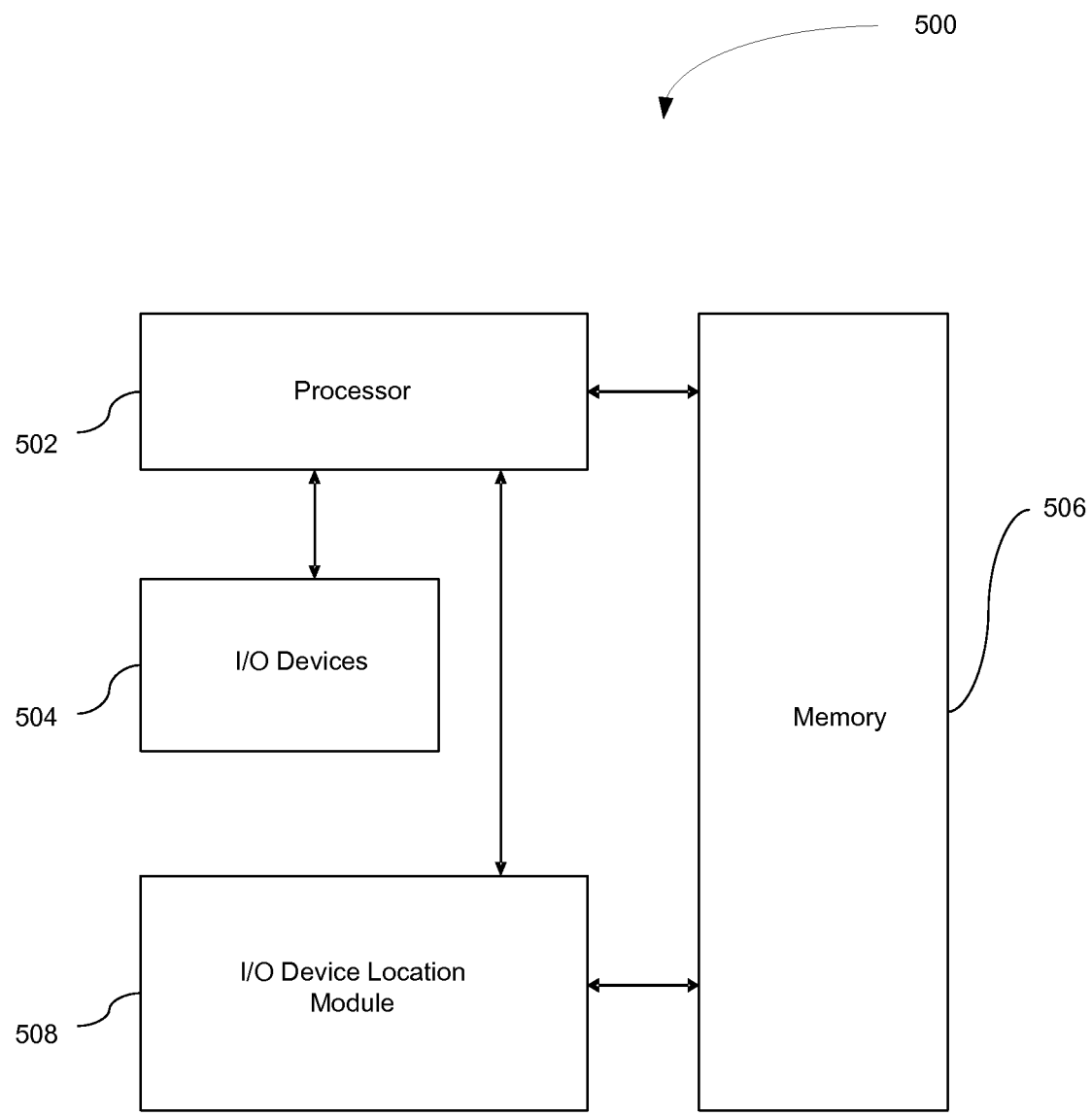
FIG. 5 illustrates a block diagram of a system that utilizes dynamic specification of location information for an I/O device that provides an interactive debugging session.

FIG. 5 illustrates a block diagram of a system 500 that utilizes dynamic specification of location information for an I/O device that provides an interactive debugging session. In one embodiment, the system 500 is suitable for storing and/or executing program code and is implemented using a general purpose computer or any other hardware equivalents. Thus, the system 500 comprises a processor 502, a memory 506, e.g., random access memory ("RAM") and/or read only memory ("ROM"), an I/O device location module 508, and various I/O devices 504. In another embodiment, a user specific runtime information module can be utilized in place of the I/O device location module 508. The user specific runtime information module may utilize a runtime parameter such as I/O device location information, a list of programs to be debugged, etc. The user specific runtime information module does not have to utilize all the different types of runtime parameters. For instance, the user specific runtime information module may or may not utilize I/O device location information as opposed to another runtime parameter.

The processor 502 is coupled, either directly or indirectly, to the memory 506 through a system bus. The memory 506 can include local memory employed during actual execution of the program code, bulk storage, and/or cache memories which provide temporary storage of at least some program code in order to reduce the number of times code must be retrieved from bulk storage during execution.

The I/O devices 504 can be coupled directly to the system 500 or through intervening input/output controllers. Further, the I/O devices 504 can include a keyboard, a keypad, a mouse, a microphone for capturing speech commands, a pointing device, and other user input devices that will be recognized by one of ordinary skill in the art. Further, the I/O devices 504 can include a receiver, transmitter, speaker, display, image capture sensor, biometric sensor, etc. In addition, the I/O devices 504 can include storage devices such as a tape drive, floppy drive, hard disk drive, compact disk ("CD") drive, etc.

Network adapters may also be coupled to the system 500 to enable the system 500 to become coupled to other systems, remote printers, or storage devices through intervening private or public networks. Modems, cable modems, and Ethernet cards are just a few of the currently available types of network adapters.

It should be understood that the method and system described herein can take the form of an entirely hardware embodiment, an entirely software embodiment, or an embodiment containing both hardware and software elements. If software is utilized to implement the method or system, the software can include but is not limited to firmware, resident software, microcode, etc.

Further, the method and/or system can take the form of a computer program product accessible from a computer-usable or computer-readable medium providing program code for use by or in connection with a computer or any instruction execution system. For the purpose of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a RAM, a ROM, a rigid magnetic disk and an optical disk. Current examples of optical disks include CD-read only memory ("CD-ROM"), CD-read/write ("CD-R/W") and DVD.

While the apparatus and method have been described in terms of what are presently considered to be the most practical and preferred embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

IBM, Language Environment, and z/OS are registered trademarks of international Business Machines Corporation in the United States, other countries, or both.

We claim:

1. A computer program product comprising a non-transitory computer readable medium having a computer readable program, wherein the computer readable program when executed on a computer causes the computer to:
   in response to input from a user, building a software application having modules with a user exit linked into the software application, wherein the user exit provides a call to an external program, and wherein the user exit contains a token that is used to access a user file that indicates an input/output device; and
   for each of multiple users concurrently debugging the software application,
      in response to initiation of debugging of a module of the modules of the software application by one of the multiple users, calling the user exit with a centralized runtime environment;
      in response to the user exit being called, invoking the external program to open the user file and to obtain the input/output device for the one of the multiple users;
      returning identification of the input/output device to the centralized runtime environment from the user exit;
      providing the identification of the input/output device to a middleware component, wherein the middleware component acts as an intermediary to the module and a debug engine; and
      providing the identification of the input/output device to the debug engine from the middleware component, wherein the debug engine initiates a debugging session of the module at the input/output device, and wherein the multiple users have concurrent debugging sessions of the modules at different input/output devices.

2. The computer program product of claim 1, wherein the user file also includes a list of programs to be debugged.

3. The computer program product of claim 1, wherein the user file also includes one or more additional runtime parameters.

4. The computer program product of claim 1, wherein the user file is named according to a naming pattern.

5. The computer program product of claim 4, wherein the user exit includes the naming pattern.

6. The computer program product of claim 5, wherein the user exit locates the user file by determining a name of the user file according to the naming pattern in the user exit.

7. The computer program product of claim 5, wherein the user exit builds a unique file name for the user file from the naming pattern and a user identification received from the middleware component.

8. The computer program product of claim 1, wherein the user file is received through a network.

9. A system comprising:
   a processor; and
   storage coupled to the processor, wherein the storage stores program code, and wherein the program code is executed by the processor to perform:
   in response to input from a user, building a software application having modules with a user exit linked into the software application, wherein the user exit provides a call to an external program, and wherein the user exit contains a token that is used to access a user file that indicates an input/output device; and
   for each of multiple users concurrently debugging the software application,
      in response to initiation of debugging of a module of the modules of the software application by one of the multiple users, calling the user exit with a centralized runtime environment;
      in response to the user exit being called, invoking the external program to open the user file and to obtain the input/output device for the one of the multiple users;
      returning identification of the input/output device to the centralized runtime environment from the user exit;
      providing the identification of the input/output device to a middleware component, wherein the middleware component acts as an intermediary to the module and a debug engine; and
      providing the identification of the input/output device to the debug engine from the middleware component, wherein the debug engine initiates a debugging session of the module at the input/output device, and wherein the multiple users have concurrent debugging sessions of the modules at different input/output devices.

10. The system of claim 9, wherein the user file also includes a list of programs to be debugged.

11. The system of claim 9, wherein the user file also includes one or more additional runtime parameters.

12. The system of claim 9, wherein the user file is named according to a naming pattern.

13. The system of claim 12, wherein the user exit includes the naming pattern.

14. The system of claim 13, wherein the user exit locates the user file by determining a name of the user file according to the naming pattern in the user exit.

15. The system of claim 13, wherein the user exit determines a user identification for a user of the debugging session by determining the user identification from the naming pattern in the user exit.

16. The system of claim 9, wherein the user exit builds a unique file name for the user file from the naming pattern and a user identification received from the middleware component.

17. The system of claim 9, wherein the user file is received through a network.

18. A method comprising:
   in response to input from a user, building a software application having modules with a user exit linked into the software application, wherein the user exit provides a call to an external program, and wherein the user exit contains a token that is used to access a user file that indicates an input/output device; and for each of multiple users concurrently debugging of a module of the modules of the software application, in response to initiation of debugging of the software application by one of the multiple users, calling the user exit with a centralized runtime environment;

in response to the user exit being called, invoking the external program to open the user file and to obtain the input/output device for the one of the multiple users;

returning identification of the input/output device to the centralized runtime environment from the user exit;

providing the identification of the input/output device to a middleware component, wherein the middleware component acts as an intermediary to the module and a debug engine; and providing the identification of the input/output device to the debug engine from the middleware component, wherein the debug engine initiates a debugging session of the module at the input/output device, and wherein the multiple users have concurrent debugging sessions of the modules at different input/output devices.

19. The method of claim 18, wherein the user file is named according to a naming pattern.

20. The method of claim 19, wherein the user exit includes the naming pattern.

21. The method of claim 20, wherein the user exit locates the user file by determining a name of the user file according to the naming pattern in the user exit.

22. The method of claim 20, wherein the user exit builds a unique file name for the user file from the naming pattern and a user identification received from a middleware component.

23. The method of claim 18, wherein the user file also includes a list of programs to be debugged.

24. The method of claim 18, wherein the user file also includes one or more additional runtime parameters.

25. The system of claim 9, wherein the user file is received through a network.

\* \* \* \* \*